United States Patent Office

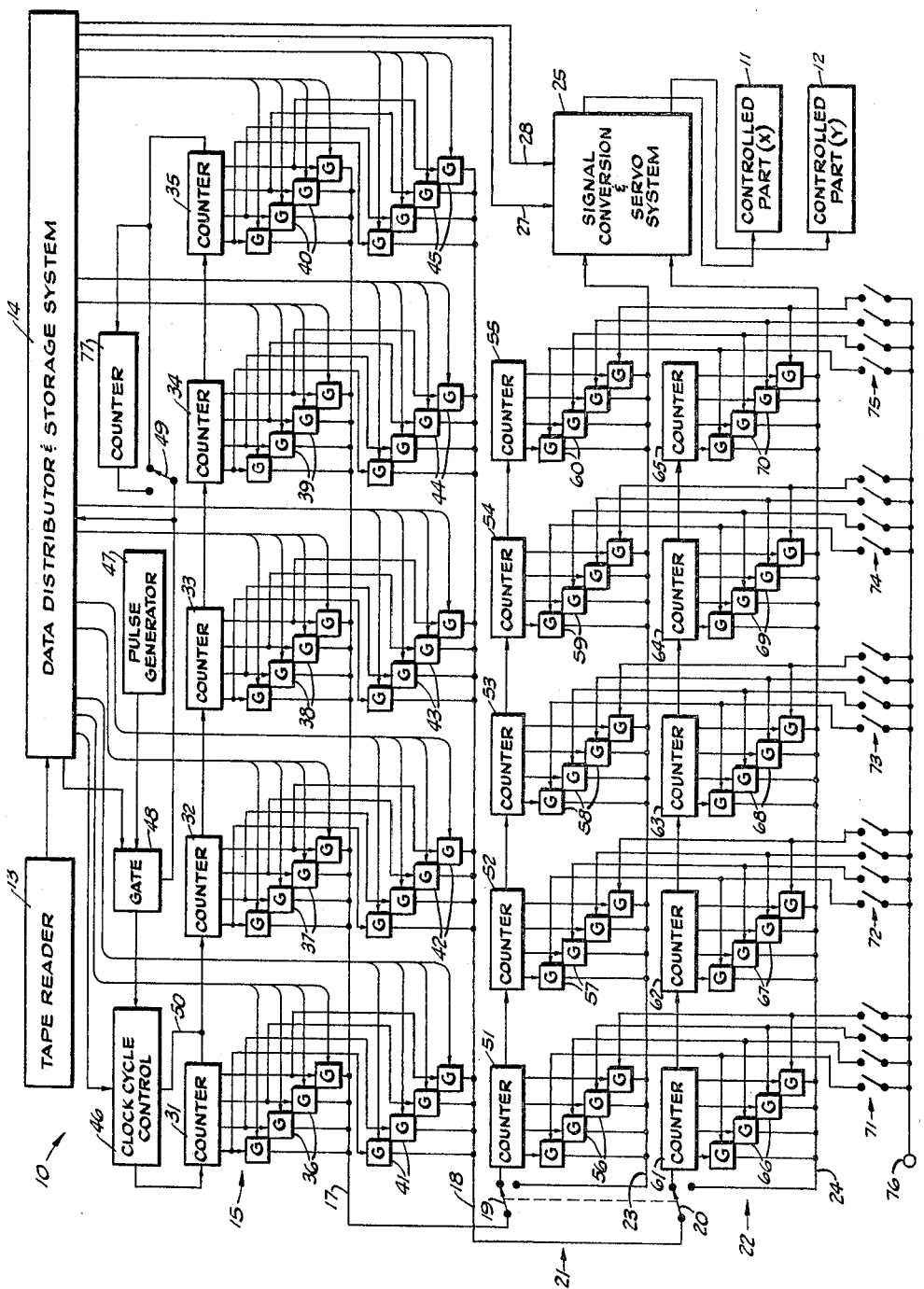

3,290,492
Patented Dec. 6, 1966

3,290,492
NUMERICAL CONTROL SYSTEM
Clyde E. Hallmark, Michigan City, Ind., assignor, by mesne assignments, to The Bunker-Ramo Corporation, Stamford, Conn., a corporation of Delaware
Filed Dec. 7, 1962, Ser. No. 243,020
1 Claim. (Cl. 235—151.11)

This invention was evolved with the general object of increasing the usefullness, efficiency and productivity of numerical control systems of the type in which a plurality of parts are moved simultaneously at respective rates in accordance with programmed information derived from punched tape or the like. The invention provides a manual override system by which the respective rates and distances of movement can be proportionally adjusted without changing the program and it is highly advantageous and valuable in many practical applications, including the control of machine tools and the control of automatic drafting instruments. The system is comparatively simple, requires a minimum number of component parts and yet is very accurate and reliable.

The invention may be applied to numerical control systems of the type wherein the movements of a plurality of parts are controlled in response to command pulse trains generated simultaneously in response to programmed information derived from punched tape. The controlled parts may, for example, be parts which operate to control relative movement between a cutter and a workpiece along mutually perpendicular axes, or similar movement of a drafting instrument relative to a table. In accordance with this invention, such command pulse trains are applied to fractional multipliers each operative to produce an output train of pulses with the number of pulses in each output train being a certain fraction of the number of pulses in the corresponding command pulse train. The fraction may be readily set by manual control switches or the like.

In machine tool or drafting element control systems, this allows adjustment of overall dimensioning by a fixed percentage. The system may be used for example in the machining of dies where it is difficult to predict how much a given material will shrink after leaving a die, and the adjustment can be readily made manually without changing the program information. In drafting instruments, a reduction or enlargement of size can be readily obtained.

Important features of the invention relate to the provision of comparatively simple circuitry using a minimum number of component parts for accomplishing the command pulse generation and the fractional multiplication in a highly accurate and reliable manner.

This invention contemplates other objects, features and advantages which will become more fully apparent from the following detailed description taken in conjunction with the accompanying drawing which illustrates a preferred embodiment of a numerical control system incorporating the manual override feature of this invention.

Referring to the drawing, reference numeral 10 generally designates a numerical control system constructed according to the principles of this invention. The illustrated system 10 is a two axis system arranged to control movement of two controlled parts 11 and 12 which may preferably be such as to cause relative movement between a cutter and a workpiece in two mutually perpendicular directions, or control of the movement of a drafting instrument relative to a drafting table in two mutually perpendicular directions. It is noted that although a two axis system is illustrated, the invention can be applied in the same way to a three axis system.

In general, the system 10 comprises a tape reader 13 which reads a block of information from punched tape and supplies such information to a data distributor and storage system 14. The system 14 controls gates of a command pulse generator generally designated by reference numeral 15 to generate command pulse trains on lines 17 and 18. The command pulse trains on lines 17 and 18 are applied through ganged switches 19 and 20 either to the input of a pair of fractional multipliers 21 and 22 or to output lines 23 and 24 of the fractional multipliers 21 and 22. Trains of output pulses are thereby developed on the lines 23 and 24 either equal to a certain fraction of the number of command pulses, or exactly equal to the number of command pulses, depending upon the position of the ganged switches 19 and 20.

Such output pulses are applied to signal conversion and servo systems 25 which function to move the controlled parts 11 and 12 through distances corresponding to the numbers of pulses in the output pulse trains. By way of example, each pulse may cause a movement through a distance of 0.0001 inch. The direction of movement is controlled by sign information applied to the systems 25 from the storage system 14, through lines 27 and 28.

The illustrated command pulse generator 15 comprises five decade counters 31–35 each having four outputs connected through groups of gates 36–40 to the line 17 and through groups of gates 41–45 to the line 18, there being four gates in each of the groups 36–45. The generator 15 operates through one cycle in response to the application of 100,000 pulses to the first counter 31, such pulses being applied from a clock cycle control circuit 46 supplied with pulses from a pulse generator 47 through a gate 48. The gate 48 is initially opened by a signal from the data distributor and storage system 14 and is closed in response to an end carry signal applied from the final counter 35 through a switch 49 to the gate 48.

Each of the decade counters 31–35 is of a type known in the art, operative to generate four series of pulses in each cycle of operation thereof with the numbers of pulses in the series being selectively addable to produce any number from one through nine and with the pulses of each series being noncoincident with the pulses of each of the other series. Preferably, a 5,2,1,1 code is used. With this arrangement, the gates 36–45 may be controlled from the data distributor and storage system to develop in each complete cycle of operation of the command pulse generator 15, a number of command pulses on each of the lines 17 and 18 equal to any number from 0 through 99,999.

The clock cycle control 46 controls the duration of the cycle. By way of example, the pulse generator 47 may supply pulses at a 100 kc. rate, and a divider in the clock cycle control 46 may divide the rate to 20 kc., to cause the command pulse generator 15 to complete a cycle in a five second interval. In some cases, pulses may be applied from the clock cycle control 46 to the input of the second counter 32, through a line 50.

The fractional multiplier 21 comprises five decade counters 51–55 each having four outputs connected through groups of gates 56–60 to the output line 23. Similarly, the fractional multiplier 22 comprises five decade counters 61–65 each having four outputs connected through groups of gates 66–70 to the output line 24.

The four gates of the group 56 are respectively connected to the four gates of the group 66 and to contacts of a group of four switches 71. Similarly, the gates of the groups 57–60 are respectively connected to gates of the groups 67–70 and to contacts of switches 72–75. All of the switches of the groups 71–75 are connected to a terminal 76 for connection to a suitable voltage source, for enabling of the gates.

The counters 51–55 and 61–65 and the gates 56–60 and 66–70 operate in the same way as the counters and gates of the command pulse generator 15 as described above, except that with the gates of the two multipliers 21 and 22 being interconnected as shown, both multiply by the same fractional decimal number, as determined by the settings of the switches.

If, for example, it is desired to reduce the size of a part to be machined or drawn to a size equal to 0.87539 of the programmed size, and that a 5,2,1,1 code is used in the fractional multipliers, the operator closes the first three switches of the group 71, the first two switches of the group 72, the first switch of the group 73, the second and third switches of the group 74 and all four switches of the group 75.

It may be noted that the gates 56–60 and 66–70, and the single pole switches 71–75 may be replaced by ganged two pole, single throw switches, and no electronic gate circuits are required in the fractional multipliers.

In some cases, it may be desirable to generate output pulses greater in number than the programmed command pulses. In that event, the switch 49 may be moved to a position opposite that illustrated to connect the gate 48 and a control input of the data distributor and storage system 14 to the output of a decade counter 77 having an input connected to the output of the final counter 35 of the command pulse generator 15. With this arrangement, one million pulses must be applied to the input of the first counter 31 before an end carry pulse is finally applied to the gate 48, and the duration of a cycle of operation is increased tenfold, with the number of command pulses being correspondingly increased. Accordingly, with the fractional multipliers 21 and 22, it is possible to effectively multiply the programmed information by any five digit decimal number from 0 to 10. It will be appreciated, of course, that additional counters like counter 77 may be employed to obtain higher multiplication factors, and also, additional counters and gates may be employed in the multipliers 21 and 22 to obtain any desired degree of accuracy.

It will be understood that modifications and variations may be effected without departing from the spirit and scope of the novel concepts of this invention.

I claim as my invention:

In a system for simultaneously controlling movement of a plurality of parts, means for simultaneously generating a plurality of command pulse trains with the rates of generation of pulses in said trains being proportional to programmed rates of movements of said parts, a plurality of fractional multipliers responsive to said command pulse trains to produce a plurality of output pulse trains, each of said fractional multipliers comprising counter circuits operable to produce a plurality of series of pulses with the numbers of pulses in said series being selectively addable to produce a desired number and with the pulses of each series being non-coincident with the pulses of each of the other series, a common output line, and selectively operable gate means for respectively applying said series of pulses to said output line to develop output pulses thereon, means interconnecting said gate means of said fractional multipliers to cause each to multiply by the same factor, and means responsive to output pulses on said output lines for moving said parts in proportion thereto.

References Cited by the Examiner

UNITED STATES PATENTS

| | | | |
|---|---|---|---|
| 2,866,506 | 12/1958 | Hierath et al. | |
| 2,922,940 | 1/1960 | Mergler. | |
| 2,970,269 | 1/1961 | Williams | 328—38 |
| 3,001,137 | 9/1961 | Kassel et al. | 328—38 |
| 3,063,015 | 11/1962 | Moore et al. | 328—41 |
| 3,069,608 | 12/1962 | Forrester et al. | |
| 3,076,601 | 2/1963 | Goetz | 328—42 |
| 3,079,522 | 2/1963 | McGarrell. | |
| 3,128,374 | 4/1964 | Ho et al | 235—151.11 |
| 3,134,064 | 5/1964 | Narbro | 235—151 |
| 3,174,367 | 3/1965 | Lukens | 235—151.11 |
| 3,175,382 | 3/1965 | Wistreich | 235—151.11 |
| 3,191,111 | 6/1965 | Greene | 235—151.11 |

MALCOLM A. MORRISON, *Primary Examiner.*

I. KESCHNER, *Assistant Examiner.*